(12) United States Patent
Geissler et al.

(10) Patent No.: US 9,127,970 B2
(45) Date of Patent: Sep. 8, 2015

(54) HYDRAULIC DEVICE

(75) Inventors: Grit Geissler, Ulm (DE); Dirk van Aalst, Nersingen (DE)

(73) Assignee: Robert Bosch GmbH, Stuttgart (DE)

( * ) Notice: Subject to any disclaimer, the term of this patent is extended or adjusted under 35 U.S.C. 154(b) by 934 days.

(21) Appl. No.: 13/321,126

(22) PCT Filed: Mar. 24, 2010

(86) PCT No.: PCT/EP2010/001825
§ 371 (c)(1),
(2), (4) Date: Apr. 13, 2012

(87) PCT Pub. No.: WO2010/133272
PCT Pub. Date: Nov. 25, 2010

(65) Prior Publication Data
US 2012/0186445 A1 Jul. 26, 2012

(30) Foreign Application Priority Data
May 18, 2009 (DE) .......................... 10 2009 021 717

(51) Int. Cl.
*F01B 31/12* (2006.01)
*G01D 21/00* (2006.01)
(52) U.S. Cl.
CPC ................ *G01D 21/00* (2013.01); *F01B 31/12* (2013.01)
(58) Field of Classification Search
CPC ............. F15B 15/2815; F15B 15/2807; F15B 15/1447; G01D 11/245; F16F 9/329

USPC ................ 92/5 R, 12.2, 71; 91/503
See application file for complete search history.

(56) References Cited

U.S. PATENT DOCUMENTS

| 5,733,105 A | * | 3/1998 | Beckett et al. ................ 417/269 |
| 7,171,808 B2 | * | 2/2007 | Kadlicko ........................ 60/486 |
| 2007/0204699 A1 | | 9/2007 | Salvo et al. |

FOREIGN PATENT DOCUMENTS

| DE | 10 2007 012 733 | | 9/2008 | |
| WO | 2004/010096 | | 1/2004 | |
| WO | WO 2004010096 | * | 1/2004 | ............. G01L 19/08 |

OTHER PUBLICATIONS

International Search Report corresponding to PCT Application No. PCT/EP2010/001825, mailed Feb. 1, 2011 (German and English language document) (5 pages).

\* cited by examiner

*Primary Examiner* — Edward Look
*Assistant Examiner* — Jason Mikus
(74) *Attorney, Agent, or Firm* — Maginot, Moore & Beck LLP

(57) ABSTRACT

A hydraulic device including an autonomous electronic sensor assembly that has at least one miniature sensing element. Sensing elements of this type require a minimal amount of space. It is especially preferred if the sensor assembly has at least one miniature transmitter. As the hydraulic device does not then require any sensitive electric cables for signal transmission, the reliability of its monitoring capabilities is optimized.

15 Claims, 2 Drawing Sheets

HYDRAULIC DEVICE

This application is a 35 U.S.C. §371 National Stage Application of PCT/EP2010/001825, filed on Mar. 24, 2010 which claims the benefit of priority to Application Serial No. DE 10 2009 021 717.7, filed on May 18, 2009 in Germany, the disclosures of which are incorporated herein by reference in their entirety.

BACKGROUND

The disclosure relates to a hydraulic device.

In hydraulic devices, there are various approaches for monitoring the operating parameters thereof, such as pressure, movement and temperature.

Sensors for hydraulic devices are known where the measuring signals and results are transmitted, and the current is supplied, via electric cables.

A disadvantage of hydraulic devices monitored in such a manner involves the cables and plug-in connections, which are obstructive during movements of components of the devices and during the maintenance thereof. Damage to the cables or plug-in connections may result in the sensors failing.

DE 10 2007 012 733 A1 discloses an autonomous pressure sensor on the housing of an axial piston unit, which pressure sensor transmits measuring signals from a transmitter to a receiver wirelessly. The electric energy required for this purpose and for obtaining and processing the electric measuring signal is generated in situ by a transducer. The specific proposal involves a piezoelement which generates the energy from pressure pulsations of the working fluid in the region of the housing.

A disadvantage of sensors of this type—in addition to limiting pressure measurements—is the space that said sensors require.

SUMMARY

By contrast, the disclosure is based on the object of providing a hydraulic device which can be monitored comprehensively and reliably and in which comprehensive "condition-monitoring" is possible, wherein the space required for the corresponding sensor arrangement is intended to be minimal.

The object is achieved by a hydraulic device as set forth below.

Further advantageous refinements of the disclosure are described below.

The hydraulic device according to the disclosure has at least one component and an autonomous electronic sensor arrangement. The sensor arrangement has at least one miniaturized pickup which is arranged on the component. Pickups of this type require minimal space.

In this case, it is particularly preferred if the sensor arrangement has at least one miniaturized transmitter.

In this case, it is particularly preferred if the sensor arrangement has at least one miniaturized receiver. Since the hydraulic device does not require any sensitive electric lines for transmitting signals, the reliability of monitoring said device is optimized.

A particularly preferred exemplary embodiment has at least one pressure pickup which is arranged on a pressurizable component of the hydraulic device. A very important parameter of the hydraulic device can therefore be monitored, and, for example, operating states can be detected and overpressure prevented.

A further particularly preferred exemplary embodiment has at least one acceleration pickup which is arranged on a moving component of the hydraulic device. By means of integration, the velocities can be calculated therefrom, and by means of repeated integration, displacement and positions can be calculated therefrom. If the acceleration pickup measures centrifugal accelerations, it is possible to calculate therefrom the rotational speed of the corresponding component by including the distance of the acceleration pickup from the axis of rotation of said component.

Piezoelements are preferred as pickups.

A further particularly preferred exemplary embodiment has at least one temperature pickup which is arranged on a component of the hydraulic device.

In a particularly preferred development, the pickups, the transmitter and a controller are integrated in the component of the hydraulic device, wherein the component forms a housing for said components. Special housings for the components are therefore omitted, and the space which said components require can be reduced to zero.

In a development according to the disclosure, the pickups, the transmitter and the controller are connected to at least one autonomous energy supply apparatus which preferably converts light energy, thermal energy or kinetic energy into electric energy. Supply cables and batteries or storage batteries for the supply of current to the components are therefore omitted, and maintenance-free autonomous operation is possible over the entire service life of the sensor arrangement.

In a preferred development of the hydraulic device according to the disclosure, the receivers are intermediate stations which, in groups, receive signals from adjacent transmitters and pass said signals onto a central receiver. By means of a suitable distribution of the intermediate stations, the necessary transmitting power of the miniaturized transmitters can be reduced and the reliability of the data transmission thereof increased.

In a particularly preferred exemplary embodiment, the hydraulic device is a hydrostatic positive displacement machine, and the component is a delivery piston. In machines of this type, the abovementioned advantages are afforded, for example, by the arrangement of the pickups and the transmitters in or on the piston or in or on a cylinder wall.

In this case, the hydrostatic positive displacement machine is preferably an axial piston unit. It is also possible here for a rotational movement, for example, of the cylinder drum thereof to be monitored, with the abovementioned advantages, by acceleration pickups.

In a preferred development, the hydraulic device is an adjustable positive displacement machine, and the component provided with a sensor arrangement according to the disclosure is an actuating piston.

In a preferred alternative, the hydraulic device has a control valve, and the component provided with a sensor arrangement according to the disclosure is a valve piston.

In a particularly preferred exemplary embodiment, the component is fixed to the housing. In this case, the use of pressure pickups and temperature pickups affords the abovementioned advantages.

The component in this case may be, for example, a standardized screw plug. The pickups and a transmitter can be integrated therein and can be fitted in a simple manner by the screw plug being screwed in in the pressure space of the hydraulic device according to the disclosure.

For reasons concerning the transmission of signals without interference, it is preferred if the components which are provided with pickups and further components of the hydraulic device are not metallic but rather are manufactured from plastics.

BRIEF DESCRIPTION OF THE DRAWINGS

Various exemplary embodiments of the disclosure are described in detail below with reference to the figures, in which.

DETAILED DESCRIPTION

Figure 1:
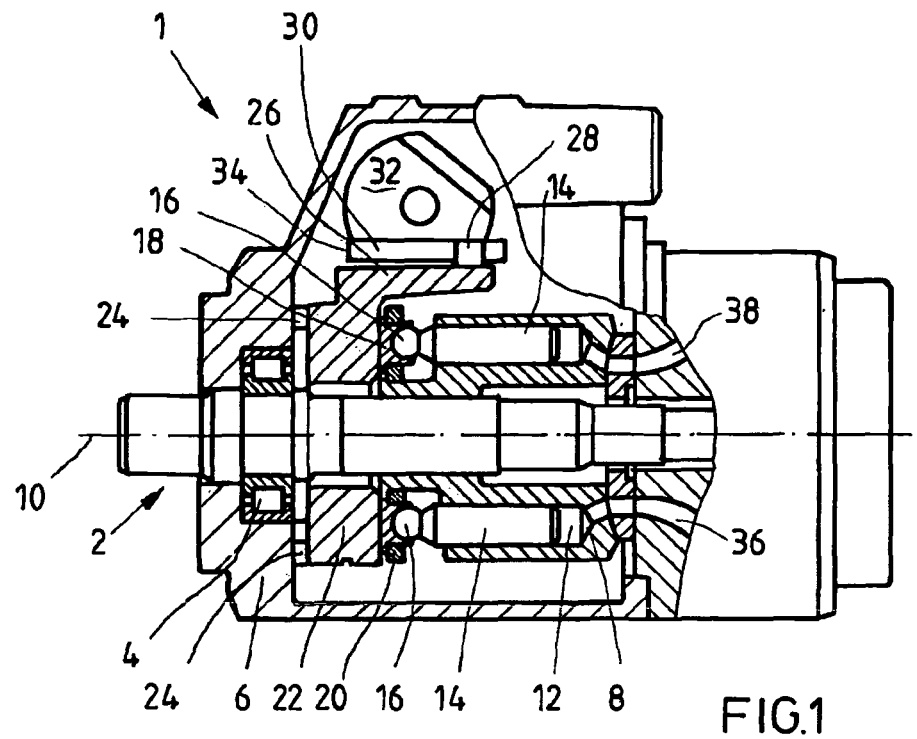
FIG. 1 shows a top view, partially sectioned, of a first exemplary embodiment of a swash plate pump according to the disclosure.

FIG. 1 shows a swash plate pump 1 according to the disclosure. All of the components shown in FIG. 1 correspond to the prior art, and therefore only essential elements and functions of the swash plate pump 1 are explained.

The swash plate pump 1 is driven by a driveshaft 2 mounted in the housing 6 via a rolling contact bearing 4. Via the driveshaft 2, a cylinder drum 8 is set into rotation about the common axis of rotation 10, wherein the cylinder drum 8 has a plurality of cylinders 12, which are distributed uniformly around the circumference, and axial pistons 14 guided therein.

The axial pistons 14 can be displaced axially in the associated cylinders 12, the axial pistons, at the end portions thereof which are on the right (in FIG. 1), delimiting pressure spaces while said axial pistons, on the end portions thereof which are on the left (in FIG. 1), are each connected to a sliding shoe 18 via a spherical piston foot 16. The piston feet 16 together with the respective sliding shoes 18 form ball and socket joints.

The sliding shoes 18 move together with the piston feet 16 on a circular path and, in the process, are prestressed to the left (in FIG. 1) against a swash plate 22 via a pull-back plate 20. In FIG. 1, the swash plate 22 is illustrated in the neutral central position thereof, in which the bearing surface thereof for the sliding shoes 18 extends perpendicularly to the axis of rotation 10 (and to the plane of projection). The swash plate 22 is arranged approximately annularly about the axis of rotation 10, the swash plate being supported to the left (in FIG. 1) against the housing 6 via rolling bodies 24.

The swash plate 22 has an eccentrically arranged arm 26 which is fastened to the outer circumference of the swash plate 22 and extends approximately parallel to the axis of rotation 10.

The arm 26 of the swash plate 22 is connected to an actuating piston 32 via a journal 28 and a sliding block 30.

During operation of the swash plate pump 1, the actuating piston 32 is adjusted perpendicularly to the plane of projection (in FIG. 1), as a result of which the swash plate 22 is pivoted from the above-described neutral position thereof about the pivot axis 34 thereof via the sliding block 30, the journal 28 and the arm 26.

Since the spherical piston feet 16 of the axial pistons 14 are held in the sliding shoes 18, during operation of the swash plate pump 1 said piston feet follow a circular path which is inclined in relation to the axis of rotation 10 and is predetermined by the bearing surface of the swash plate 22. As a result, the axial pistons 14 each execute an oscillating movement in the associated cylinder 12, said axial pistons executing a suction stroke during a first semicircular path and a positive displacement stroke during a second semicircular path. In this case, a channel assigned to the one semicircular path is produced as a high pressure channel 36 and the other channel assigned to the other semicircular path is produced as a suction channel 38.

The pitch angle of the swash plate 22 in relation to the axis of rotation 10 and in relation to the cylinder drum 8 and the axial pistons 14 can be set via the actuating piston 32, thus enabling the stroke of the axial pistons 14 and therefore the delivery volume of the swash plate pump 1 to be changed. In this case, the swash plate 22 of the swash plate pump 1 illustrated can be pivoted through, and therefore the high pressure channel 36 and the suction channel 38 can be interchanged, and the direction of delivery of the swash plate pump 1 can be changed.

Figure 3:
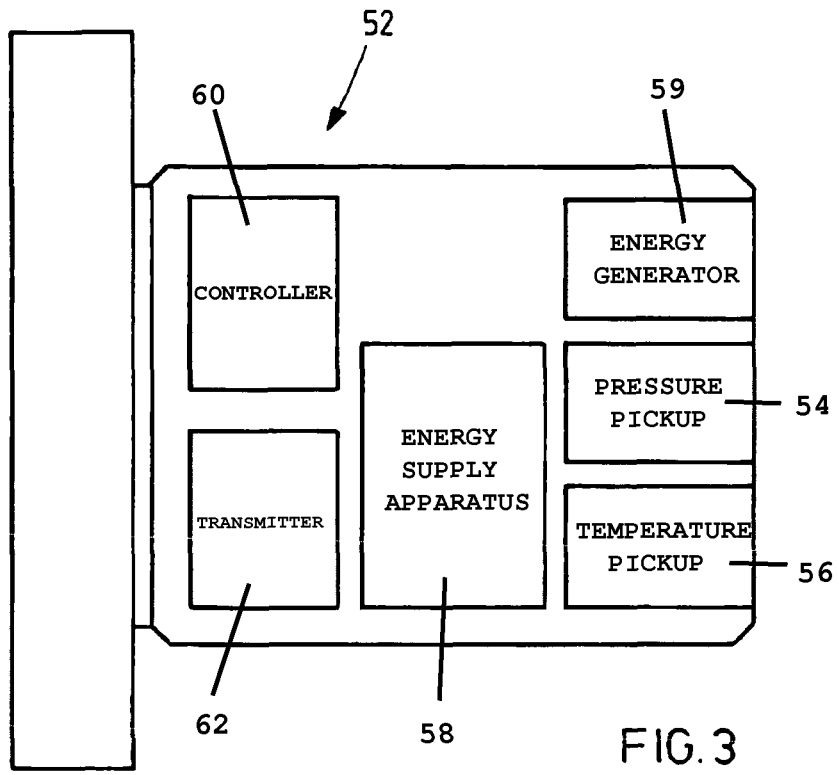
FIG. 3 shows a schematic illustration of a screw plug provided according to the disclosure with a sensor arrangement.

FIG. 3 shows schematically a screw plug 52, in the interior of which a first exemplary embodiment of a sensor arrangement according to the disclosure is provided. Said screw plug consists of a pressure pickup 54, a temperature pickup 56, an energy supply apparatus 58, an energy generator 59, a controller 60 and a transmitter 62. All of the components 54, 56, 58, 59, 60, 62 are miniaturized and combined together as a unit. The components 54, 56, 58, 59 are inserted into a recess on the end side of the screw plug 52 in such a manner that the screw plug 52 forms a housing for the components 54, 56, 58, 59. Furthermore, the sensor arrangement has a receiver (not shown) which is arranged, for example, on an outer wall of the housing 6 of the swash plate pump 1 at a location which makes it possible to receive, as far as possible without interference, the electromagnetic waves emitted by the transmitter 62.

The pressure pickup 54 and the temperature pickup 56 pick up measured values from the interior of the swash plate pump 1. The measured data are processed by the controller 60 and are passed by the transmitter 62 to the receiver (not shown).

The energy required by the components 54, 56, 60, 62 is generated by the energy generator 59. For this purpose, the vibration/pulsation or heat of the pressure medium present on the end side (on the right in FIG. 3) is converted into electric energy and is distributed by the energy supply apparatus 58 to the components 54, 56, 60, 62, the energy requirement of which is minimized by said components being miniaturized.

According to the disclosure, the components 54, 56, 58, 59, 60, 62 are accommodated in a protected manner in the screw plug 52 and are easily accessible and interchangeable by unscrewing the screw plug 52 from the housing 6. The sensor arrangement according to the disclosure does not in any way obstruct the operation and the maintenance of the swash plate pump 1, and therefore, even after maintenance or exchange of components of the swash plate pump 1, the hydraulic device which is monitored according to the disclosure is totally and absolutely reliable.

Figure 4:
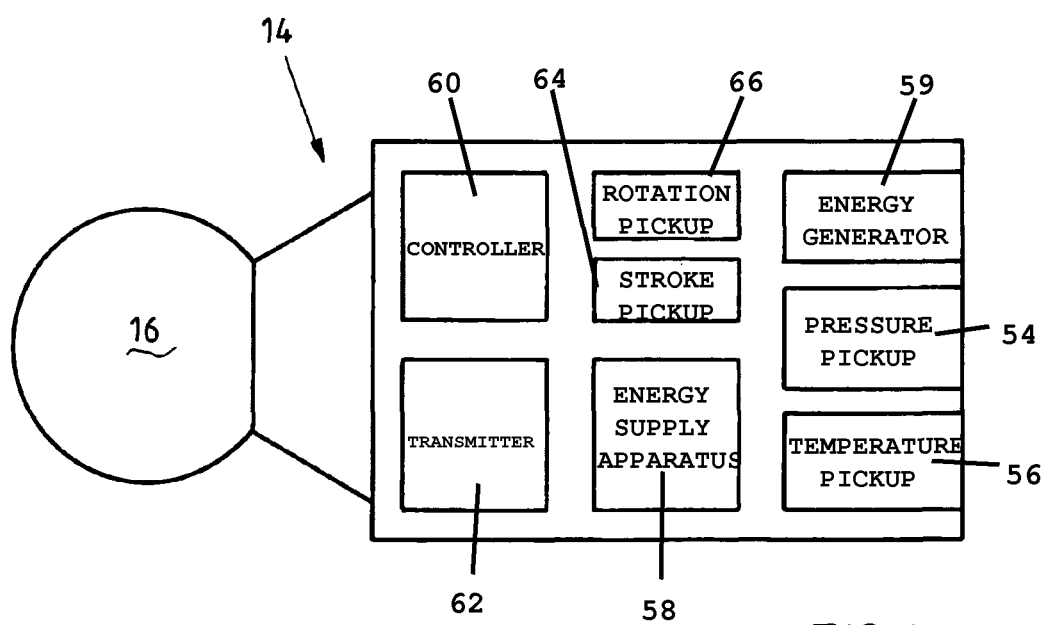
FIG. 4 shows a schematic illustration of an axial piston provided according to the disclosure with a sensor arrangement.

FIG. 4 shows schematically an axial piston 14, in the interior of which a second exemplary embodiment of a sensor arrangement according to the disclosure is provided. The sensor arrangement serves to monitor further operating parameters of the swash plate pump 1 (according to FIG. 1). In this case, a stroke pickup 64 and a rotation pickup 66 are provided in addition to the pressure pickup 54 and the temperature pickup 56. The pickups 54, 56, 64, 66 are accommodated together with the energy supply apparatus 58, the energy generator 59, the controller 60 and the transmitter 62 in the interior of an axial piston 14, at least the pressure pickup 54 being in contact on the end side with the pressure medium present in the cylinder 12.

The components 54, 56, 58, 59, 60, 62 correspond to those of the previously described exemplary embodiment (according to FIG. 3). The additional stroke pickup picks up accelerations in the direction of the stroke of the axial piston 14 (laterally in FIG. 4), while the rotation pickup 66 picks up accelerations perpendicularly thereto.

The acceleration values determined by the stroke pickup are converted by the controller 60 by means of integration into stroke velocities and, by means of repeated integration, into stroke displacements. Delivery volumes of the swash plate pump 1 can be calculated therefrom with the inclusion of the stroke volume of the cylinders 12.

The centrifugal accelerations determined by the rotation pickup 66 are converted into rotational speeds of the cylinder drum 8 and of the driveshaft 2. In this case, the rotation pickup 66 measures the centrifugal acceleration from which the rotational speed of the cylinder drum 8 can be calculated by including the distance of the rotation pickup 66 and of the axial piston 14 from the axis of rotation 10 of said cylinder drum.

The sensor arrangement shown for an axial piston 14 may also be redundantly provided in a plurality of axial pistons of the same machine in order to improve the reliability and the accessibility.

Data for numerous operating parameters with regard to the pressure medium in the cylinder 12 and with regard to the entire swash plate pump 1 are therefore available according to the disclosure. Said data can be used to achieve comprehensive "condition-monitoring".

Figure 2:
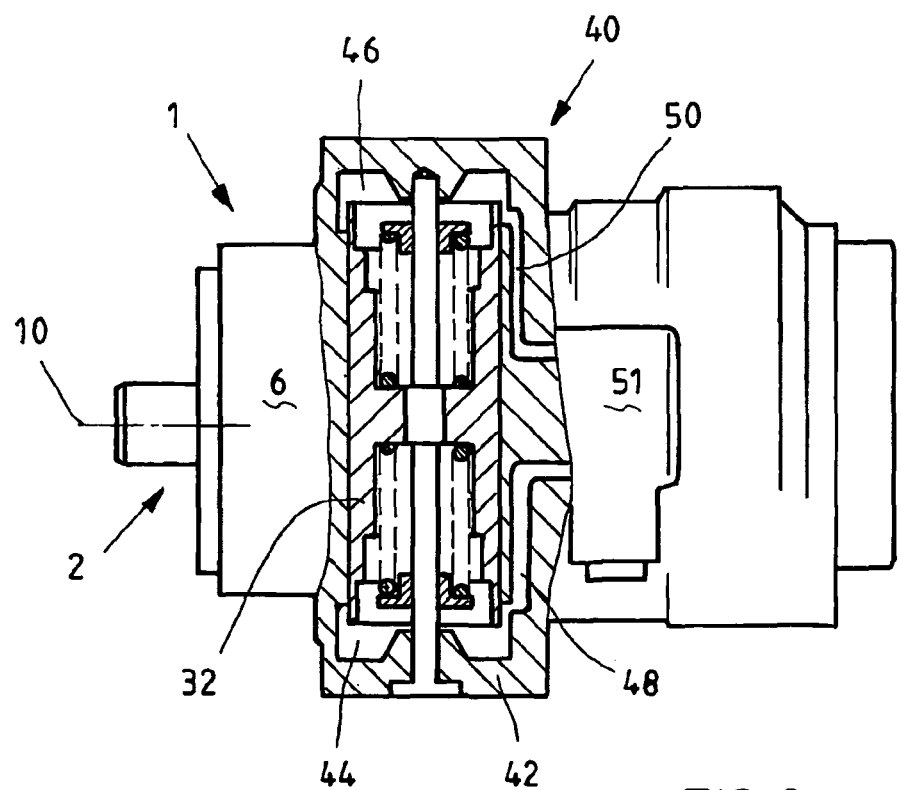
FIG. 2 shows a side view of the swash plate pump according to the disclosure with a sectioned adjustment unit.

FIG. 2 shows essential parts of the adjustment unit 40 of the swash plate pump 1 according to the disclosure. All of the components shown in FIG. 2 correspond to the prior art, and therefore only essential elements and functions of the adjustment unit 40 are explained.

The adjustment unit 40 is of substantially mirror-symmetrical design with respect to the axis of rotation of the swash plate pump 1. It has an adjustment housing 42, in which the actuating piston 32 separates two adjustment pressure spaces 44, 46 from each other.

In the central position of the actuating piston 32 that is shown (in FIG. 2) and in which the latter is prestressed by springs, the swash plate 22 is located (cf. FIG. 1) in the neutral position oriented perpendicularly to the axis of rotation 10. If pressure medium is delivered into the associated adjustment pressure space 44, 46 via one of the adjustment channels 48, 50, the actuating piston 32 is displaced downward or upward from the central position thereof which is shown (in FIG. 2). Upon simultaneous driving of the driveshaft 2 of the swash plate pump 1, the axial pistons 14 as a result execute a stroke movement during the rotational movement thereof, thus causing the swash plate pump 1 according to the disclosure to suck up pressure medium via the suction channel 38 and to displace said pressure medium via the high pressure channel 36.

In particular, monitoring according to the disclosure of the actuating piston 32 extending beyond the depicted exemplary embodiments according to FIGS. 3 and 4 is provided. Via an acceleration pickup along the stroke direction of said actuating piston (from the top downward in FIG. 2), an adjustment displacement of the actuating piston 32 can be determined and the adjustment angle of the swash plate 22 calculated therefrom.

In addition to the abovementioned exemplary embodiments or alternatively a sensor arrangement according to the disclosure can be arranged on a valve body (not shown) of the control valve 51, with which the pivot angle of the swash plate pump 1 is set via the adjustment channels 48, 50, the adjustment pressure spaces 44, 46 and via the actuating piston 32.

In a departure from the exemplary embodiment shown in FIG. 4, the energy generator 59 can also generate electric energy from the kinetic energy of the axial piston 14. This manner of obtaining energy is appropriate in particular for a sensor arrangement on the driveshaft 2, on the sliding shoes 18 or in the axial pistons 14 or the cylinder drum 8.

The electronic "condition-monitoring" according to the disclosure may alternatively also be carried out, for example, at control units.

As an alternative to the described autonomous energy generation by the energy generators 59, energy may also be input contactlessly from the outside.

A hydraulic device comprising an autonomous electronic sensor arrangement which has at least one miniaturized pickup is disclosed. Pickups of this type require minimal space.

In this case, it is particularly preferred if the sensor arrangement has at least one miniaturized transmitter. Since the hydraulic device then does not require any sensitive electric lines for transmitting signals, the reliability of the monitoring of said devices is optimized.

The invention claimed is:

1. A hydraulic device comprising:
a component; and
an autonomous electronic sensor arrangement,
wherein the component is a screw plug, and
wherein the sensor arrangement has at least one miniaturized pickup which is inserted into a recess defined in an end side of the screw plug in such a manner that the screw plug forms a sensor housing for the sensor arrangement.

2. The hydraulic device as claimed in claim 1, wherein the sensor arrangement has at least one miniaturized transmitter.

3. The hydraulic device as claimed in claim 2, wherein the sensor arrangement further has at least one miniaturized receiver.

4. The hydraulic device as claimed in claim 1, wherein the at least one miniaturized pickup is a pressure pickup, and the screw plug closes a hollow space filled with pressure medium such that the pressure pickup is exposed to a pressure of the pressure medium.

5. The hydraulic device as claimed in claim 1, further comprising an acceleration pickup arranged on a movable component of the hydraulic device.

6. The hydraulic device as claimed in claim 1, wherein the at least one miniaturized pickup is a piezoelement.

7. The hydraulic device as claimed in claim 1, wherein the at least one miniaturized pickup is a temperature pickup.

8. The hydraulic device as claimed in claim 2, wherein the screw plug forms a housing of the at least one miniaturized pickup, the transmitter and a controller.

9. The hydraulic device as claimed in claim 2, wherein the at least one miniaturized pickup, the transmitter and a controller are connected to at least one autonomous energy supply apparatus.

10. The hydraulic device as claimed in claim 9, wherein the energy supply apparatus is connected to an energy generator configured to convert one of light energy, thermal energy, and kinetic energy into electric energy.

11. The hydraulic device as claimed in claim 3, wherein the at least one miniaturized receiver is an intermediate station configured to receive signals from adjacent transmitters and pass said signals onto a central receiver.

12. The hydraulic device as claimed in claim 1, said hydraulic device being a hydrostatic positive displacement machine, wherein a further miniaturized pickup is arranged on a delivery piston.

13. The hydraulic device as claimed in claim 12, wherein the hydrostatic positive displacement machine is an axial piston unit.

14. A hydrostatic positive displacement machine comprising:
- an actuating piston configured to adjust a displacement of the hydrostatic positive displacement machine; and
- an autonomous electronic sensor arrangement,
- wherein the sensor arrangement includes at least one miniaturized pickup arranged on the actuating piston.

15. A hydrostatic positive displacement machine comprising:
- a delivery piston;
- an actuating piston configured to adjust a displacement of the delivery piston;
- a control valve including a valve piston, of the control valve being configured to control actuation of the actuating piston; and
- an autonomous electronic sensor arrangement including at least one miniaturized pickup arranged on the valve piston of the control valve.

* * * * *